(12) United States Patent
Chen et al.

(10) Patent No.: US 8,132,065 B2
(45) Date of Patent: Mar. 6, 2012

(54) HYBRID SPHERE DECODING METHOD AND SYSTEM

(75) Inventors: Chin-Hung Chen, Tainan (TW); Jia-Hao Wu, Taoyuan County (TW); Yung-Yih Jian, Taoyuan County (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 1162 days.

(21) Appl. No.: 11/978,642

(22) Filed: Oct. 30, 2007

(65) Prior Publication Data

US 2008/0153444 A1    Jun. 26, 2008

(51) Int. Cl.
*G06F 11/00* (2006.01)
(52) U.S. Cl. ...................................................... 714/746
(58) Field of Classification Search ................... 714/746, 714/794, 795, 796, 799; 375/262, 341, 224, 375/227, 264
See application file for complete search history.

(56) References Cited

U.S. PATENT DOCUMENTS

| | | | | |
|---|---|---|---|---|
| 5,901,182 A * | 5/1999 | Kot | ................................ | 375/341 |
| 6,035,269 A | 3/2000 | Kim | | |
| 6,460,033 B1 * | 10/2002 | Perttunen | ............................... | 1/1 |
| 6,859,434 B2 * | 2/2005 | Segal et al. | ..................... | 370/230 |
| 7,020,679 B2 * | 3/2006 | Tian | ................................ | 709/201 |
| 7,599,436 B2 * | 10/2009 | Kobayakawa | ............ | 375/240.16 |
| 7,735,010 B2 * | 6/2010 | Zhang et al. | ................... | 715/713 |
| 7,822,150 B2 * | 10/2010 | Davis et al. | .................... | 375/340 |
| 7,882,100 B2 * | 2/2011 | Andrei | ........................... | 707/714 |
| 2005/0135498 A1 | 6/2005 | Yee | | |
| 2005/0146951 A1 * | 7/2005 | Horai et al. | ..................... | 365/200 |
| 2011/0179035 A1 * | 7/2011 | Zhang et al. | .................... | 707/739 |

OTHER PUBLICATIONS

Taiwanese Office Action dated Feb. 17, 2011 for Application No. 096148606. (No English Translation).

* cited by examiner

*Primary Examiner* — Phung M Chung
(74) *Attorney, Agent, or Firm* — Birch, Stewart, Kolasch & Birch, LLP

(57) ABSTRACT

A hybrid sphere decoding method is disclosed. Received data is processed to obtain preliminary parameters. $M_{bf}$ layers are determined to use breadth-first search and $M_{df}$ layers to use depth-first search. A search process is implemented based on the preliminary parameters, in which $M_{bf}$ layers are searched using breadth-first search and $M_{df}$ layers are searched using depth-first search.

25 Claims, 16 Drawing Sheets

$SNR$: signal to noise ratio
$RTC$: run time constraint
$N_t$: # of transmit antennas
$N_r$: # of receive antennas
$M_c$: modulation level
$\mathbf{H}$: estimated channel matrix
$\mathbf{y}$: received vector
$\mathbf{R}$: upper-triangular matrix from QRD
$\mathbf{s}_{ZF}$: zero forcing solution
$\mathbf{s}_{ML}$: ML solution
$\mathbf{p}$: ordering index
$r$: initial radius
$K_m$: # of survival paths at $m$-th layer in the breadth-first portion
$C_m$: # of nodes to be enumerated at $m$-th layer in the depth-first portion
$DF\_ratio$: 0%~100%

FIG. 7

HYBRID SPHERE DECODING METHOD AND SYSTEM

BACKGROUND OF THE INVENTION

1. Field of the Invention

The invention relates to wireless communication, and more particularly to a hybrid sphere decoding method and system.

2. Description of the Related Art

MIMO is an abstract mathematical model for multi-antenna communication systems. MIMO technology has attracted the attention of wireless communications developers, because it significantly increases transmission throughput and range at the same bandwidth and same overall transmitting power. In general, MIMO technology increases the spectral efficiency of a wireless communication system. MIMO exploits the multipath scattering effect to increase data throughput and range, or reduce bit error rate, rather than attempting to eliminate it as in conventional SISO (Single-Input Single-Output) communication systems. MIMO can also be used in conjunction with Orthogonal Frequency Division Multiplexing (OFDM), and is now part of the IEEE 802.16 standard and will also be included in the IEEE 802.11n High-Throughput standard, which is expected to be finalized in mid 2007. Standardization of MIMO to be used in 3G standards such as High-Speed Downlink Packet Access (HSDPA) is currently ongoing. A typical MIMO data model is illustrated in FIG. 1.

A baseband equivalent data model in which a transmitter comprises $N_t$ transmit antennas and a receiver comprises $N_r$ receive antennas is represented as:

$$\tilde{y} = \tilde{H}\tilde{s} + \tilde{n},$$

where, $$\tilde{y} = \begin{bmatrix} y_1 \\ y_2 \\ \vdots \\ y_{N_r} \end{bmatrix}, \tilde{s} = \begin{bmatrix} s_1 \\ s_2 \\ \vdots \\ s_{N_t} \end{bmatrix}, \tilde{n} = \begin{bmatrix} n_1 \\ n_2 \\ \vdots \\ n_{N_r} \end{bmatrix},$$

$$\tilde{H} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r1} & h_{N_r2} & \cdots & h_{N_rN_t} \end{bmatrix}, \tilde{n}$$

represents the noise added to the receiver, $\tilde{H}$ represents a channel transformation function, and $h_{ij}$ represents the channel response from j-th transmit antennas to the i-th receive antennas. Referring to the baseband data model, $\tilde{y}$, $\tilde{s}$, $\tilde{n}$, and $\tilde{H}$ are complex vectors, which can be converted to a real data model, represented as:

$$\underbrace{\begin{bmatrix} \text{Re}(\tilde{y}) \\ \text{Im}(\tilde{y}) \end{bmatrix}}_{y} = \underbrace{\begin{bmatrix} \text{Re}(\tilde{H}) & -\text{Im}(\tilde{H}) \\ \text{Im}(\tilde{H}) & \text{Re}(\tilde{H}) \end{bmatrix}}_{H} \underbrace{\begin{bmatrix} \text{Re}(\tilde{s}) \\ \text{Im}(\tilde{s}) \end{bmatrix}}_{s} + \underbrace{\begin{bmatrix} \text{Re}(\tilde{n}) \\ \text{Im}(\tilde{n}) \end{bmatrix}}_{n}.$$

A MIMO receiver detects the transmitted symbols 's' according to the received signals 'y'.

Typically, maximum likelihood detection (MLD), with complexity proportional to $2^{N_t * M_c}$, where $N_t$ is the number of transmit antennas and $M_c$ is the modulation order, is considered the optimal signal detection method. If the transmitter, for example, comprises 4 antennas, indicating signal s comprises 4 symbols ($s_1 \sim s_4$) and each symbol is modulated according to 64-quadrature amplitude modulation (64-QAM, $M_c=6$), to obtain the optimal solution, the receiver must examine $64^4$ possible solutions. Such a high-complexity method, however, may in practice be impossible to implement. Accordingly, sub-optimal detection methods with lower complexity are provided, such as Vertical Bell Laboratories Layered Space-Time (V-BLAST), Zero Forcing (ZF), and Minimum Mean Square Error (MMSE). Furthermore, a sphere decoding (SD) method is also provided to efficiently decrease the complexity of the MLD. Conventional ML detection methods introduce a cost function that considers $N_t$ transmitted symbols jointly while the sphere decoding method, on the other hand, can take apart the joint cost function into partial functions such that signal combinations apparently exceeding predefined cost constraints can be reasonably eliminated. The MLD is mathematically described to be equivalently represented as:

$$\hat{s}_{ML} = \underset{s \in \Lambda}{\arg\min}\|y - Hs\|^2$$

$$= \underset{s \in \Lambda}{\arg\min}\left\{\begin{matrix}(s - \tilde{s}_{ZF})^H H^H H(s - \tilde{s}_{ZF}) + \\ y^H(I - H(H^H H)^{-1} H^H)y\end{matrix}\right\}$$

$$= \underset{s \in \Lambda}{\arg\min}\{(s - \tilde{s}_{ZF})^H H^H H(s - \tilde{s}_{ZF})\}$$

$$= \underset{s \in \Lambda}{\arg\min}\{\|H(s - \tilde{s}_{ZF})\|^2 \leq r^2\}.$$

The symbol ^ indicates a set of all symbol vectors 's' and $\|H(s - \tilde{s}_{ZF})\|^2$ indicates a transformed cost function. The set of {Hs} is regarded as the lattice generated by H and 's' can be regarded as the coordinates of the lattice point. The MLD method searches the lattice to locate a lattice point closest to $H\tilde{s}_{ZF}$. Thus, $H\tilde{s}_{ZF}$ can be served as a sphere center, and an abstract spherical surface in multidimensional space can be created when an applicable radius 'r' is defined. The MLD method searches out the coordinate of a lattice point closest to the sphere center $H\tilde{s}_{ZF}$, as shown in FIG. 2. The MLD equivalent function is further simplified and represented as:

$$\hat{s}_{ML} = \underset{s \in \Lambda}{\arg\min}\|y - Hs\|^2$$

$$= \underset{s \in \Lambda}{\arg\min}\{(s - \tilde{s}_{ZF})^H H^H H(s - \tilde{s}_{ZF})\}$$

$$= \underset{s \in \Lambda}{\arg\min}\{(s - \tilde{s}_{ZF})^H R^H R(s - \tilde{s}_{ZF})\}$$

$$= \underset{s \in \Lambda}{\arg\min}\|R(s - \tilde{s}_{ZF})\|^2.$$

R indicates an upper triangular matrix and is generated by QR decomposition or Cholesky factorization. An upper limit $r^2$ is defined to constrain the search range, such that $$\|R(s - \tilde{s}_{ZF})\|^2 = \sum_{m=1}^{M} r_{m,m}^2 \left|(s_m - \tilde{s}_{zf,m}) + \sum_{j=m+1}^{M} \frac{r_{m,j}}{r_{m,m}}(s_j - \tilde{s}_{zf,j})\right|^2 \leq r^2.$$

As the equivalent formula of $\|R(s - \tilde{s}_{ZF})\|^2$ shown, the Euclidean distance (ED) is composed of M Euclidean distance increments $$(EDI)|e_m|^2,$$

$$\text{where } |e_m|^2 = r_{m,m}^2 \left| (s_m - \tilde{s}_{zf,m}) + \sum_{j=m+1}^{M} \frac{r_{m,j}}{r_{m,m}} (s_j - \tilde{s}_{zf,j}) \right|^2.$$

The partial Euclidean distance (PED) of m-th layer is defined and represented as:

$$d_m = \sum_{i=m}^{M} r_{i,i}^2 \left| (s_i - \tilde{s}_{zf,i}) + \sum_{j=i+1}^{M} \frac{r_{i,j}}{r_{i,i}} (s_j - \tilde{s}_{zf,j}) \right|^2$$

$$= d_{m+1} + |e_m|^2.$$

The $d_m$ merely associates with $[s_m, s_{m+1}, \ldots, s_M]$ and the SD searching process can thus be converted to a recursive tree search structure, as shown in FIG. 3. Additionally, $\tilde{s}_{m|m+1}$ is defined based on Schnorr-Euchner (SE) enumeration and is represented as:

$$\tilde{s}_{m|m+1} = \begin{cases} \tilde{s}_{zf,m} - \frac{1}{r_{m,m}} \left( \sum_{j=m+1}^{M} r_{m,j}(s_j - \tilde{s}_{zf,j}) \right), & m = 1, 2, \ldots, (M-1) \\ \tilde{s}_{zf,M}, & m = M. \end{cases}$$

When seeking the m-th layer, the SE enumeration first searches the signal node with minimum EDI: $\hat{s}_{m|m+1}(\hat{s}_{m|m+1}=\text{slice}(\tilde{s}_{m|m+1}))$ and then proceed with the other nodes around $\tilde{s}_{m|m+1}$ in a zigzag fashion. Thus, the enumeration guarantees that signal nodes with smaller EDI can be preferentially visited, thereby accelerating the average seek speed.

As described, the traditional MLD is too complex to carry out the optimum solution. Thus, the invention provides a hybrid sphere decoding method and system applied to MIMO technology, reducing the complexity and decoding latency of MLD.

BRIEF SUMMARY OF THE INVENTION

Hybrid sphere decoding methods are provided. An exemplary embodiment of a hybrid sphere decoding method comprises the following. Received data is processed to obtain preliminary parameters. $M_{bf}$ layers are determined to use breadth-first search and $M_{df}$ layers to use depth-first search. A search process is implemented based on the preliminary parameters, in which $M_{bf}$ layers are searched using breadth-first search and $M_{df}$ layers are searched using depth-first search.

Hybrid sphere decoding systems are provided. An exemplary embodiment of a hybrid sphere decoding system comprises a configure unit, a preprocessing unit, and a search unit. The configure unit determines $M_{bf}$ layers to use breadth-first search and $M_{df}$ layers to use depth-first search. The preprocessing unit processes received data to obtain preliminary parameters. The search unit implements a search process based on the preliminary parameters, in which $M_{bf}$ layers are searched using breadth-first search and $M_{df}$ layers are searched using depth-first search.

Communication devices are provided. An exemplary embodiment of a communication device comprises a processing unit. The processing unit processes the received data to obtain preliminary parameters, determines $M_{bf}$ layers to use breadth-first search and $M_{df}$ layers to use depth-first search, and implements a search process based on the preliminary parameters, wherein $M_{bf}$ layers are searched using breadth-first search and $M_{df}$ layers are searched using depth-first search.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 7 shows parameters applied to the system shown in FIG. 6;

DETAILED DESCRIPTION OF THE INVENTION

Figure 1:
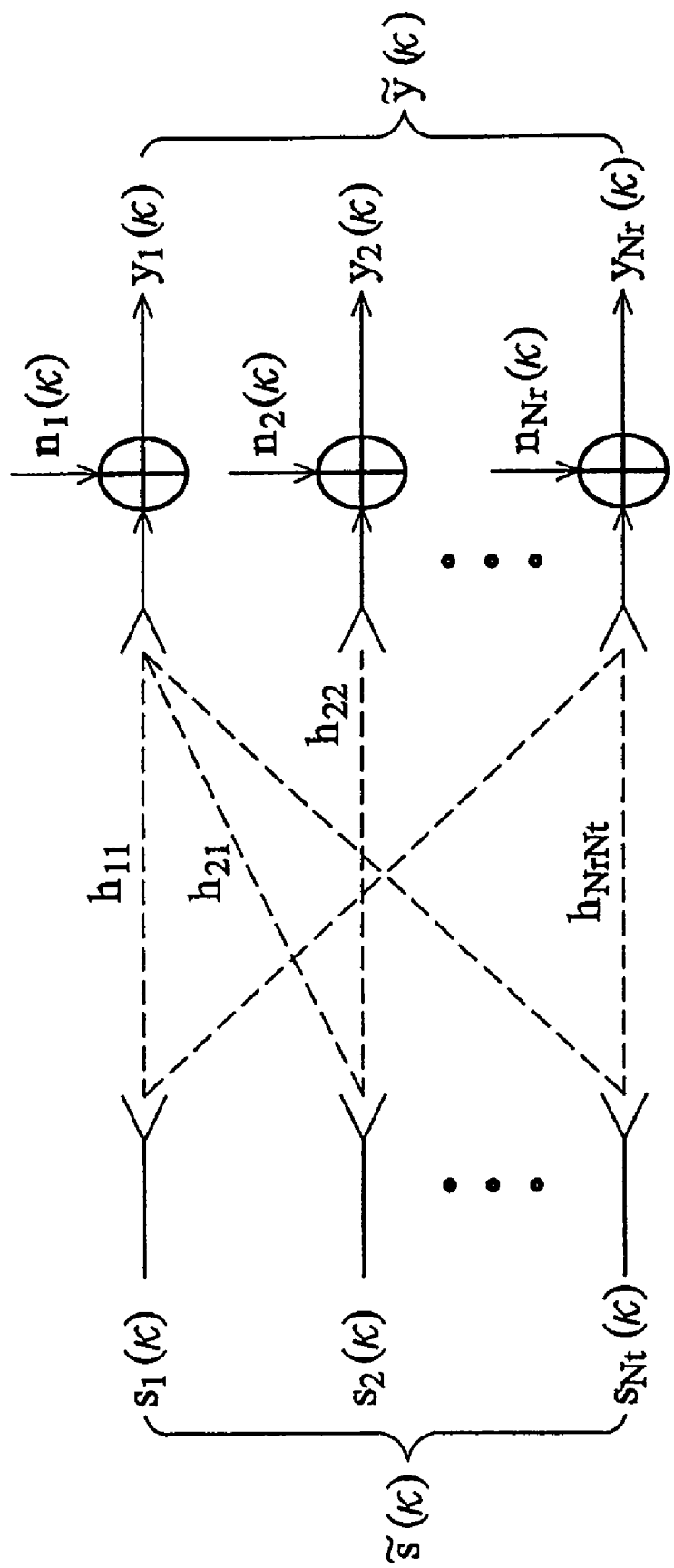
FIG. 1 is a schematic view of a typical MIMO signal model.
Figure 2:
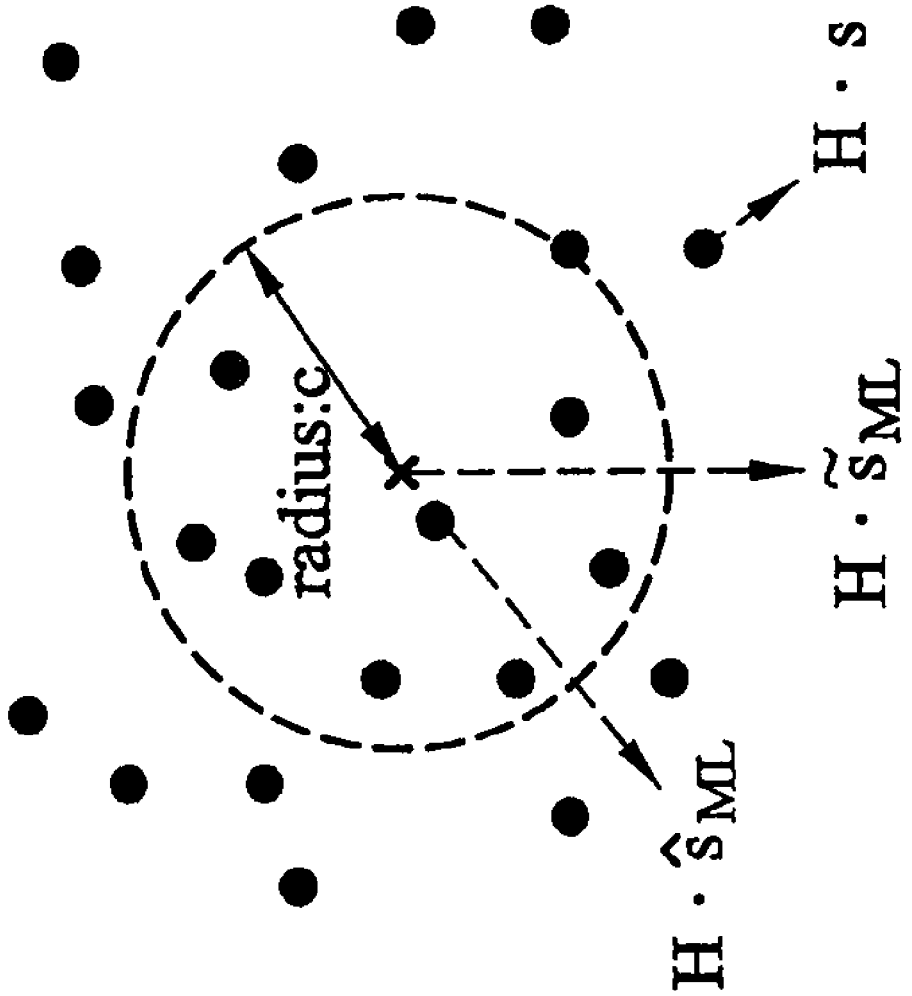
FIG. 2 is a schematic view of a sphere decoding.

Several exemplary embodiments of the invention are described with reference to FIGS. 5 through 15, which generally relate to a hybrid sphere decoding. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a hybrid sphere decoding method and system.

The sphere decoding is introduced to MIMO technology to reduce the complexity of MLD. The sphere decoding first defines a logical sphere radius to search lattices within the radius. The seek speed of the sphere decoding changes based on the transmission environment, modulation order (indicating the width of a search tree), and the number of transmit antennas (the depth of a search tree). The most widely used sphere decoding methods comprise depth-first search (DFS) and breadth-first search (BFS).

In graph theory, breadth-first search (BFS) is a graph search algorithm that begins at the root node and explores all the neighboring nodes. Then for each of those nearest nodes, it explores their unexplored neighbor nodes, and so on, until it locates the target. BFS is an uninformed search method that expands and examines all nodes of a graph systematically without considering the target until the target is located.

Depth-first search (DFS) is an algorithm for traversing or searching a tree, tree structure, or graph. Intuitively, one starts at the root (selecting some node as the root in the graph case) and explores as deep as possible along each branch before backtracking. Formally, DFS is an uninformed search that progresses by expanding the first child node of the search tree that appears and thus continues deeper until a target node is located, or until it hits a node that has no children. The search backtracks, returning to the most recent node if exploration is incomplete.

Figure 3:
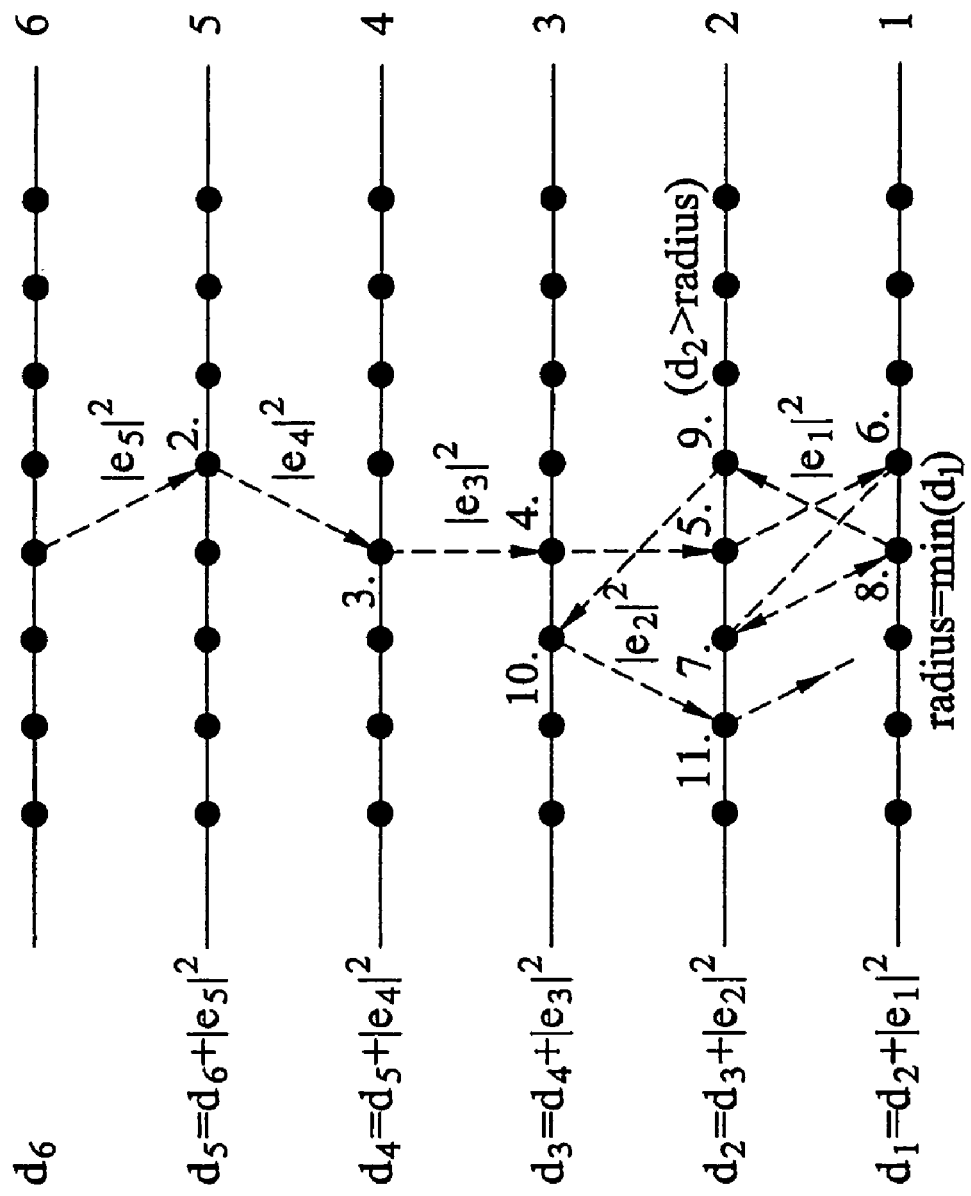
FIG. 3 is a schematic view of a depth-first search (DFS)

Efficient search can be achieved using the depth-first search combining the Schnorr-Euchner (SE) enumeration method that visits a child node which results in the smallest Euclidean distance increment (EDI) for each layer. When the bottom layer is achieved, a currently retrieved Euclidean distance serves as an initial radius r and $r^2$ is obtained. Once the PED of a layer is greater than $r^2$, the down search is stopped, and it turns back to the upper layer to locate a parent node that has the smallest PED among those unexplored neighboring nodes and proceeds with depth-first searching, as shown in FIG. 3.

Figure 4:
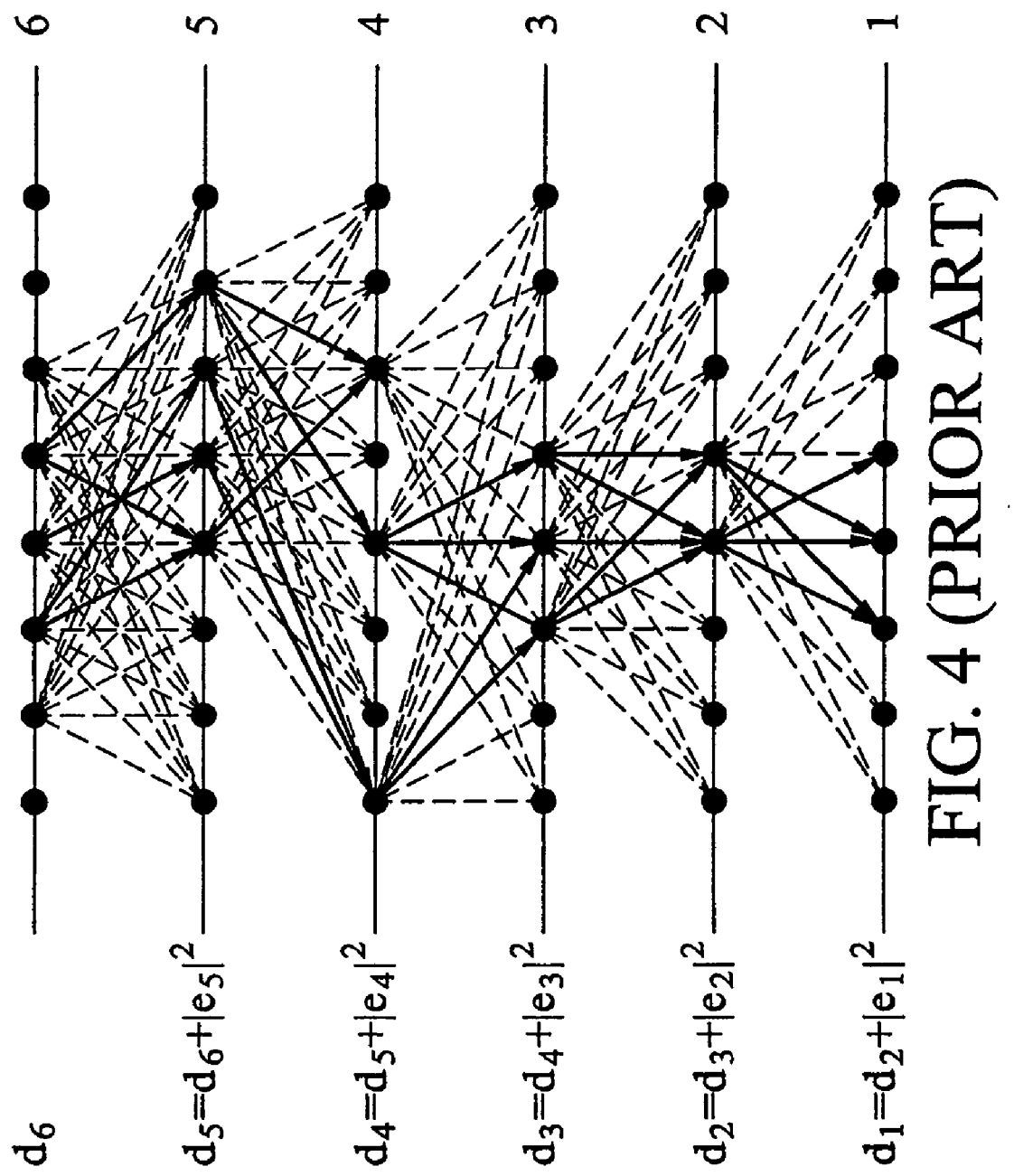
FIG. 4 is a schematic view of a breadth-first search (BFS)
Figure 5:
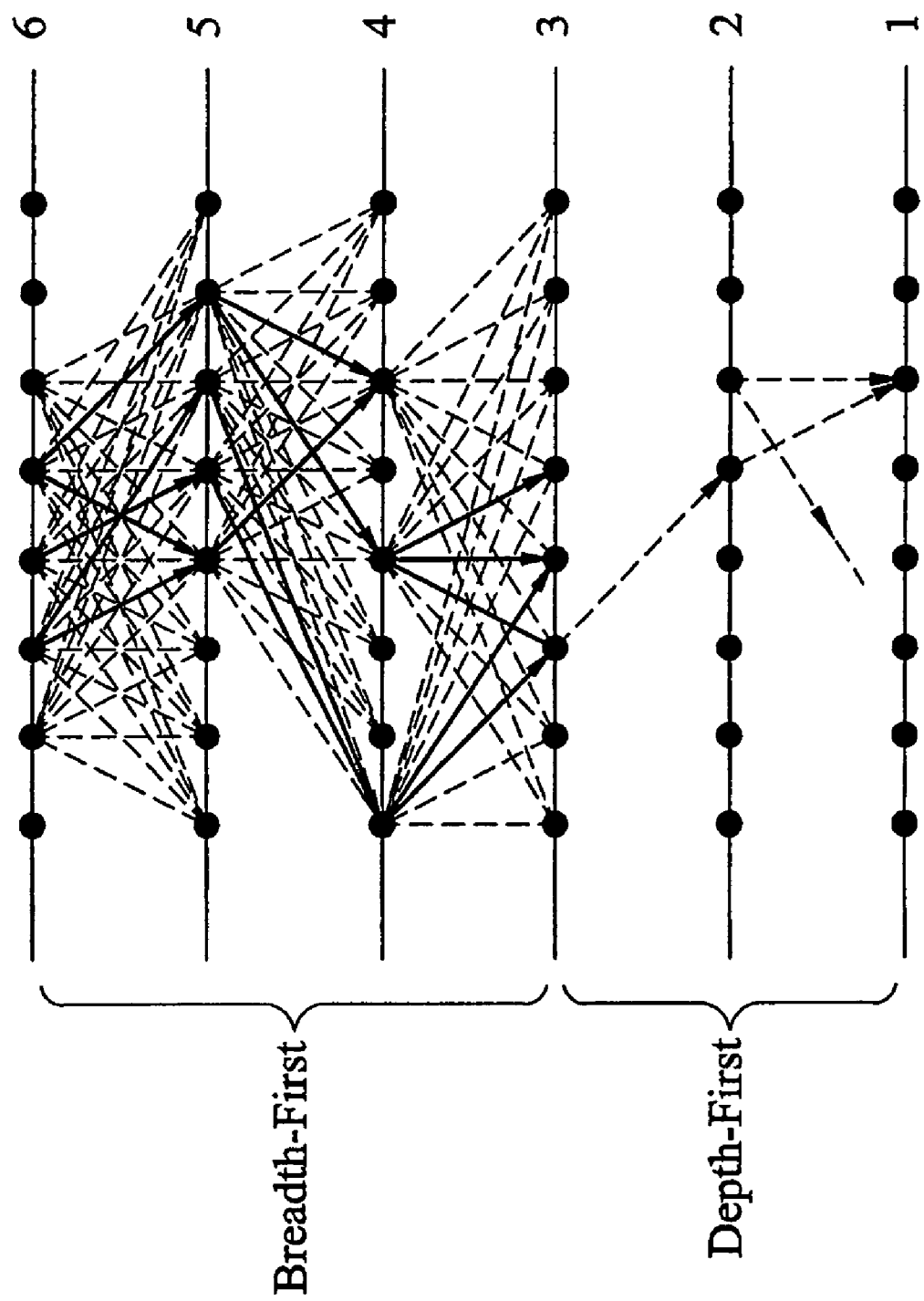
FIG. 5 is a schematic view of an embodiment of a hybrid sphere decoding combining depth-first search (DFS) and breadth-first search (BFS)

With respect to the breadth-first search, the K-best algorithm is famously applied. The K-best algorithm provides close-to-ML bit error rate (BER) performance, while its circuit regularity is higher than that with depth-first search. The K-best algorithm only retains at most K survival paths in each layer and calculates their partial Euclidean distance (PED) according to nodes associated with them individually. K paths with smaller partial Euclidean distance (PED) are then selected, and their terminal nodes will act as parent nodes to the nodes of the next layer, as shown in FIG. 4.

The depth-first search (DFS) and breadth-first search (BFS) comprise individual advantages and disadvantages, as shown in Table 1.

TABLE 1

| | | |
|---|---|---|
| Depth-First Search (DFS) | 1. Higher average throughput at higher SNR. 2. Yields exact ML solution. | 1. Throughput varies much. |
| Breadth-First Search (BFS) | 1. Lower average throughput. 2. Does not necessarily yield the ML solution. | 1. Regular data path (good for VLSI). 2. Stable throughout. |

The invention combines both methods, upper layer nodes are searched by the breadth-first search (BFS) method, and lower layer nodes are searched by the depth-first search (DFS) method. Thus, with fewer layers being searched by DFS, the maximum decoding delay can be reduced in comparison with full DFS. On the other hand, with some layers being searched by DFS, the average seek speed can be accelerated in comparison with full BFS.

Figure 6:
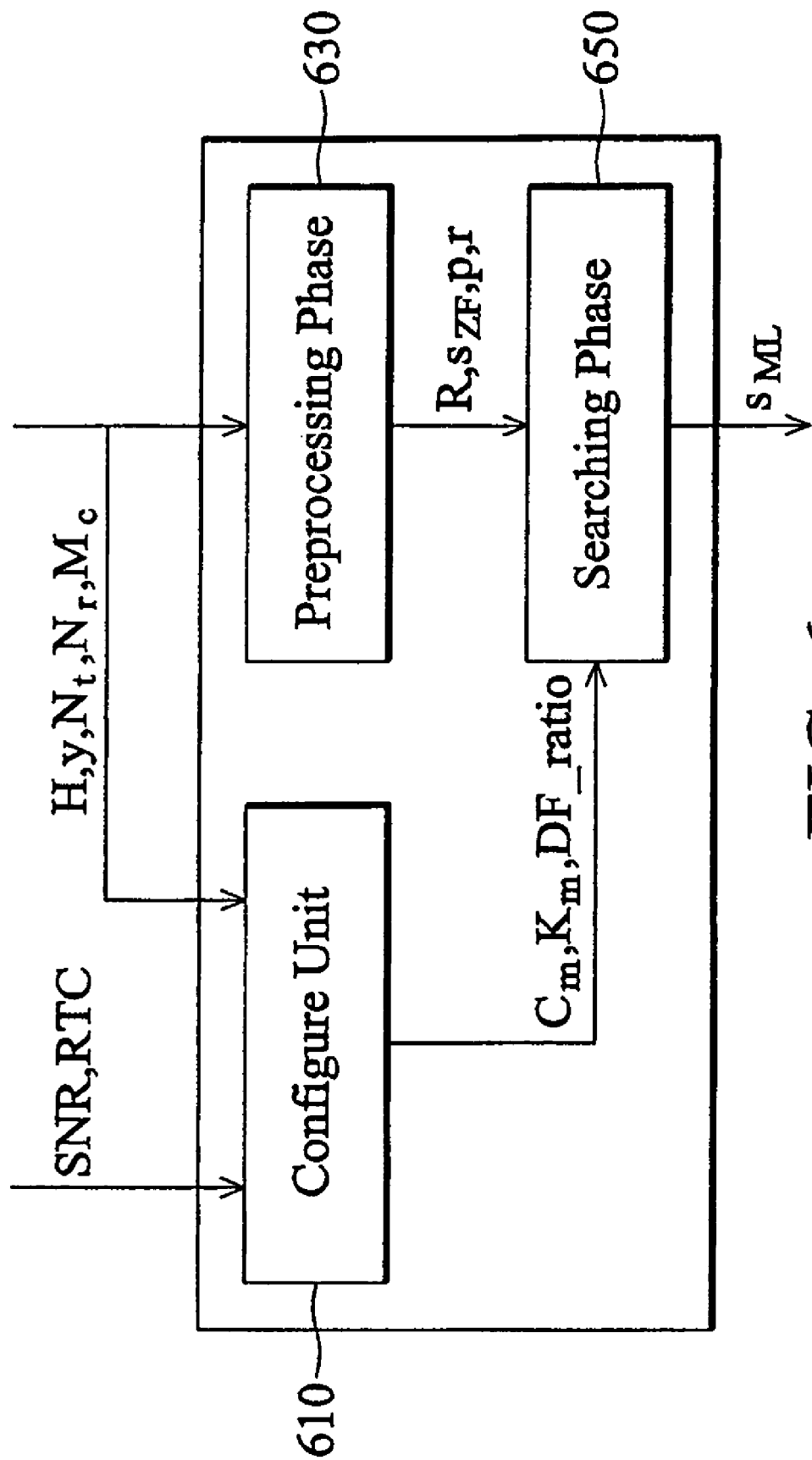
FIG. 6 is a schematic view of an embodiment of a hybrid sphere decoding system.

FIG. 6 is a schematic view of an embodiment of hybrid sphere decoding system applied to a wireless device.

The system comprises a configure unit 610, a preprocessing unit 630, and a search unit 650. When a system search begins, configure unit 610 first estimates a search ration (DF_ratio) to determine both the number of layers allocated in the depth-first search (DFS) and in the breadth-first search (BFS) portion, and imposes the constraint number of survival paths ($K_m$) on each layer in the breadth-first search (BFS) portion and the constraint number of nodes to be enumerated ($C_m$) on each layer in the depth-first search (DFS) portion according to the modulation order, the number of transmit and receive antennas, run time constraint (RTC) or signal to noise ratio (SNR). Other parameters are shown and explained in FIG. 7. $K_m$ may be equal to or smaller than the number of all possible survival paths retained from m-th BF layer. $C_m$ may be equal to or smaller than the number of candidate nodes at m-th DF layer. For example, in our exemplary embodiment, the number of candidate nodes at each layer is 8 for 64QAM, 4 for 16QAM, and 2 for QPSK. If the RTC is loose, for example, the DF_ratio, $C_m$ or the $K_m$ can be increased, and, if tight, the DF_ratio, $C_m$ or the $K_m$ can be decreased. Search unit 650 retrieves search parameters and searches nodes accordingly.

Figure 8A:
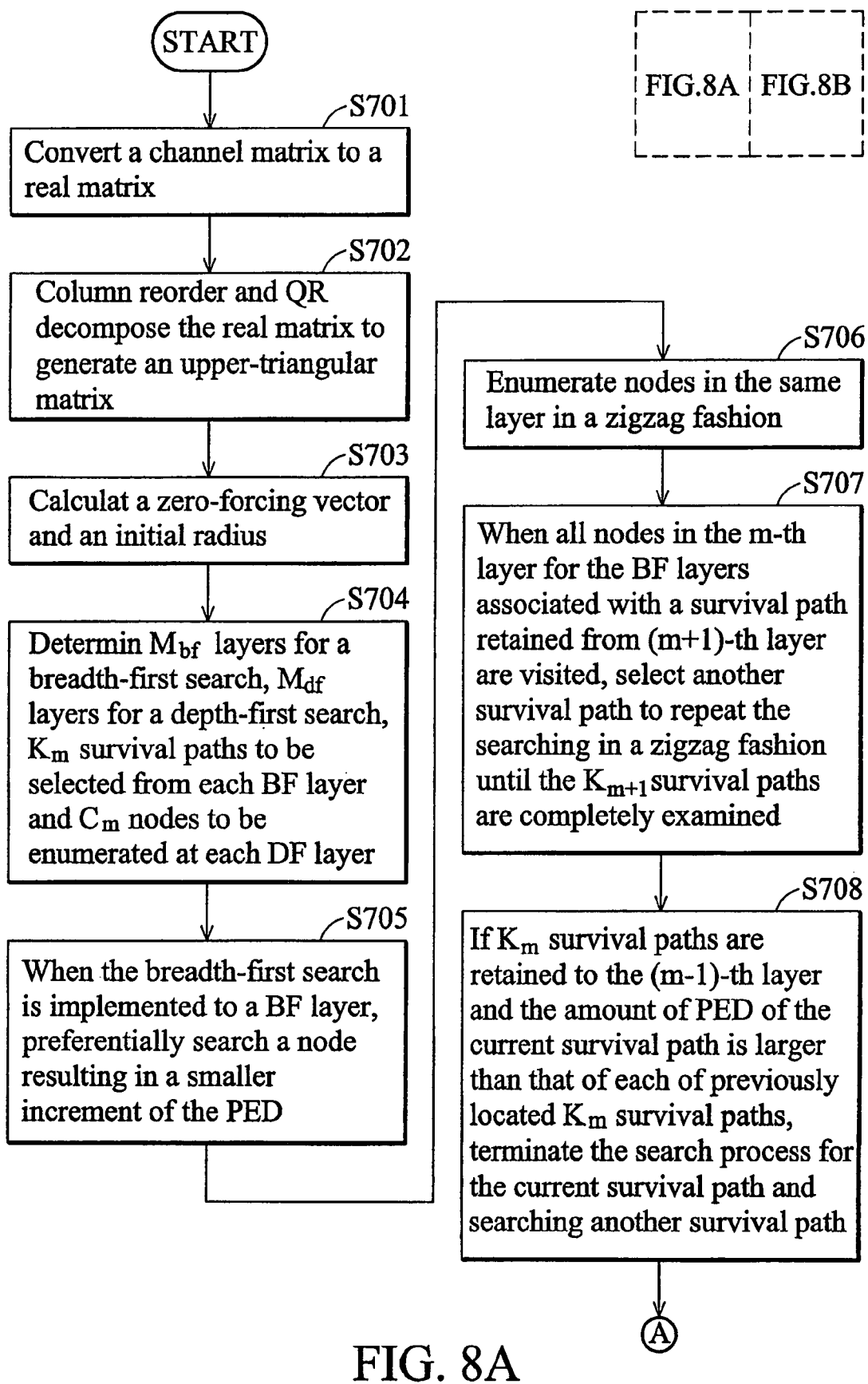
FIGS. 8A and 8B are flowcharts of an embodiment of a hybrid sphere decoding method comprising a preprocessing phase and a searching phase.
Figure 8B:
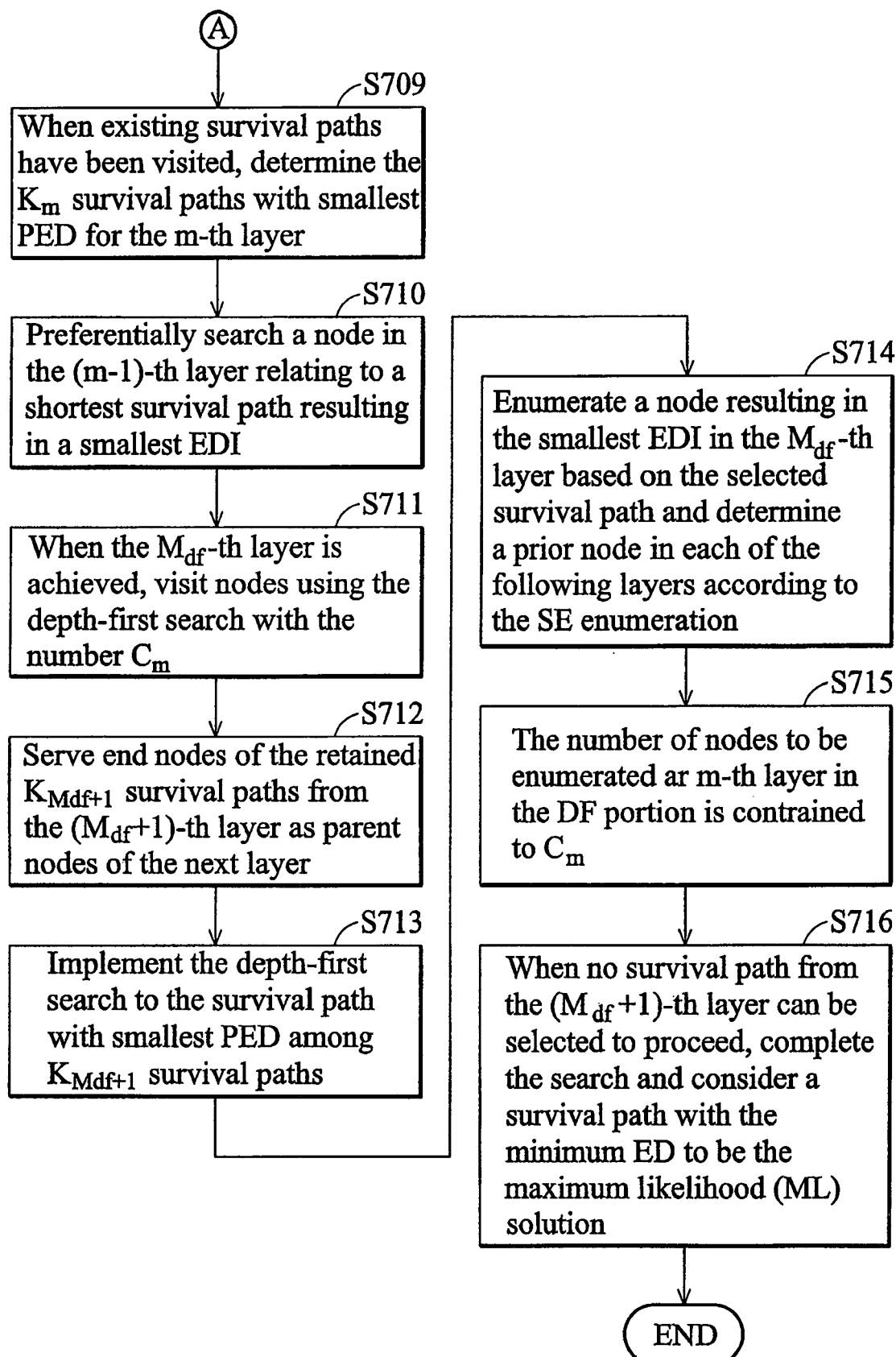
Figure 15:
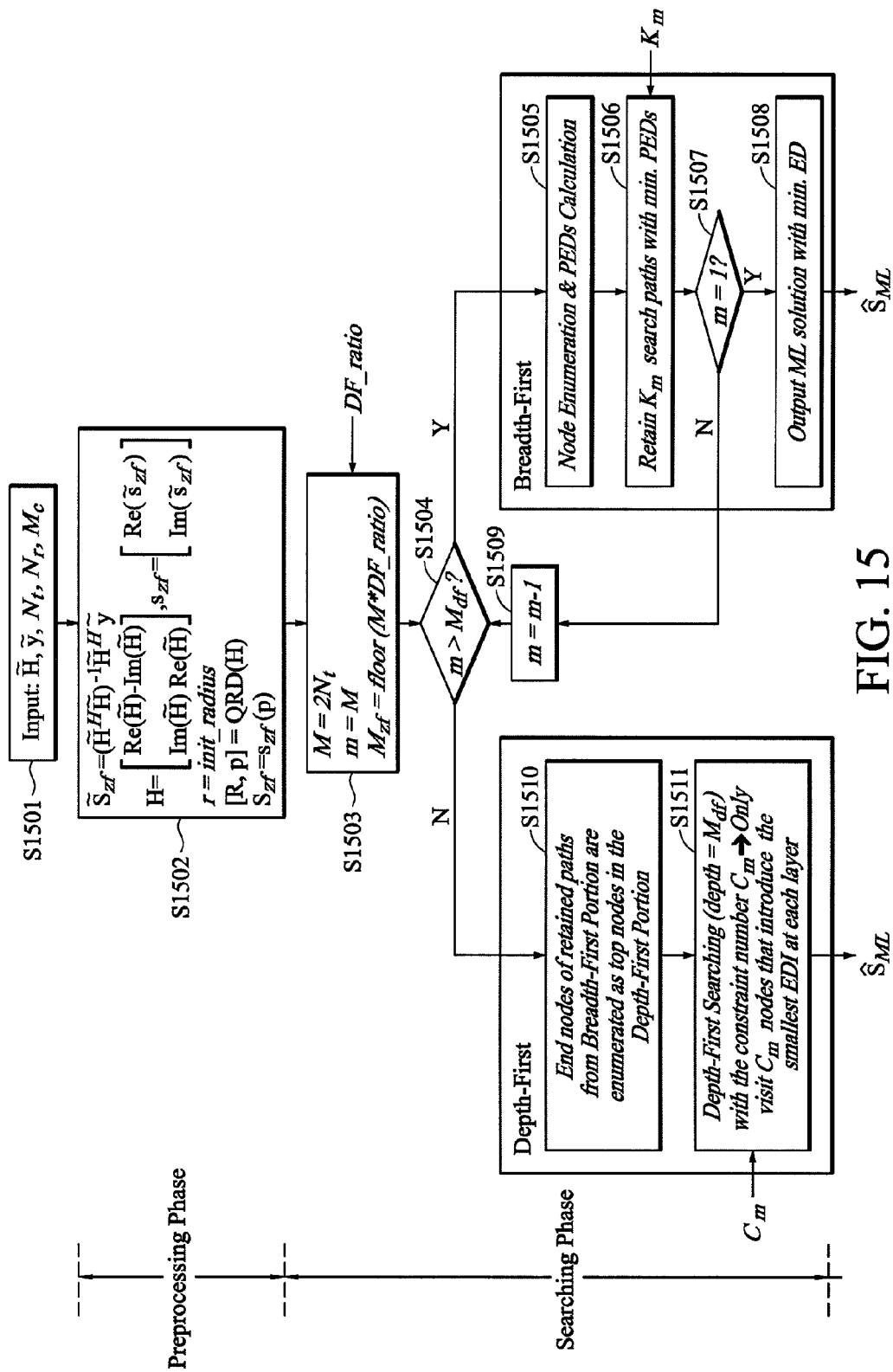
FIG. 15 is a flowchart of an embodiment of a detailed hybrid sphere decoding method comprising a preprocessing phase and a searching phase.

FIGS. 8A and 8B are flowcharts of a hybrid sphere decoding method applied to a wireless device, which can be referred to in FIG. 15.

A channel matrix $\tilde{H}$ is first converted to a real matrix H (step S701). The real matrix H is then column reordered and QR decomposed (or Cholesky factorized) to generate an upper-triangular matrix R (step S702). When the number of receive antennas is greater than that of transmit antennas, only non-zero row vectors of the upper-triangular matrix R are adopted. Additionally, a zero-forcing vector $\tilde{s}_{ZF}$ is obtained from $\tilde{s}_{ZF}=(\tilde{H}^H\tilde{H})^{-1}\tilde{H}^H\tilde{y}$. A hard decision is applied to $\tilde{s}_{ZF}$ to obtain an initial solution $\hat{s}_{ZF}=\text{slice}(\tilde{s}_{ZF})$ (step S703). As described in the depth-first search (DFS), $\|H(\hat{s}_{ZF}-\tilde{s}_{ZF})\|$ serves as an initial radius r. Thus, with respect to the pre-processing, the initial radius r, upper-triangular matrix R, and zero-forcing vector $\tilde{s}_{ZF}$ are obtained.

The sphere decoding (SD) indicates a tree search process and a sub-lattice of dimension n represents all possible node combinations residing in the top n layers of the tree. The numbers of DF layers ($M_{df}$) and BF layers ($M_{bf}=M-M_{df}$), the survival path number "$K_m$" to be selected from each BF layer, and the number of nodes to be enumerated "$C_m$" at each DF layer are determined according to system parameters comprising SNR, RTC, $N_t$, $N_r$, $M_c$, and the like (step S704). It is noted that steps S702, S703, and S704 can be simultaneously performed. When an index m of the top layer is defined as M (m=M) and that of the bottom layer is defined as 1 (m=1), with respect to the hybrid sphere decoding, each of $M_{bf}$ layers (the upper layers) is searched using the breadth-first search (BFS) method. When nodes residing in the m-th layer are searched, a node which leads to a smallest increment of PED is first searched. Thus, when nodes residing in the M-th, (M−1)-th, (M−2)-th, . . . , and (m+1)-th layers ([$s_{m+1}$, $s_{m+2}$, . . . $s_M$]) have been located, a node leading to smallest Euclidean distance increment (EDI) and residing in the m-th layer can be calculated and represented as $\hat{s}_{m|m+1}=\text{slice}(\tilde{s}_{m|m+1})$, in which $\tilde{s}_{m|m+1}$ is represented as:

$$\tilde{s}_{m|m+1} = \begin{cases} \tilde{s}_{zf,m} - \dfrac{1}{r_{m,m}}\left(\displaystyle\sum_{j=m+1}^{M} r_{m,j}(s_j - \tilde{s}_{zf,j})\right), & m = 1, 2, \ldots, (M-1) \\ \tilde{s}_{zf,M}, & m = M. \end{cases}$$

Figure 9:
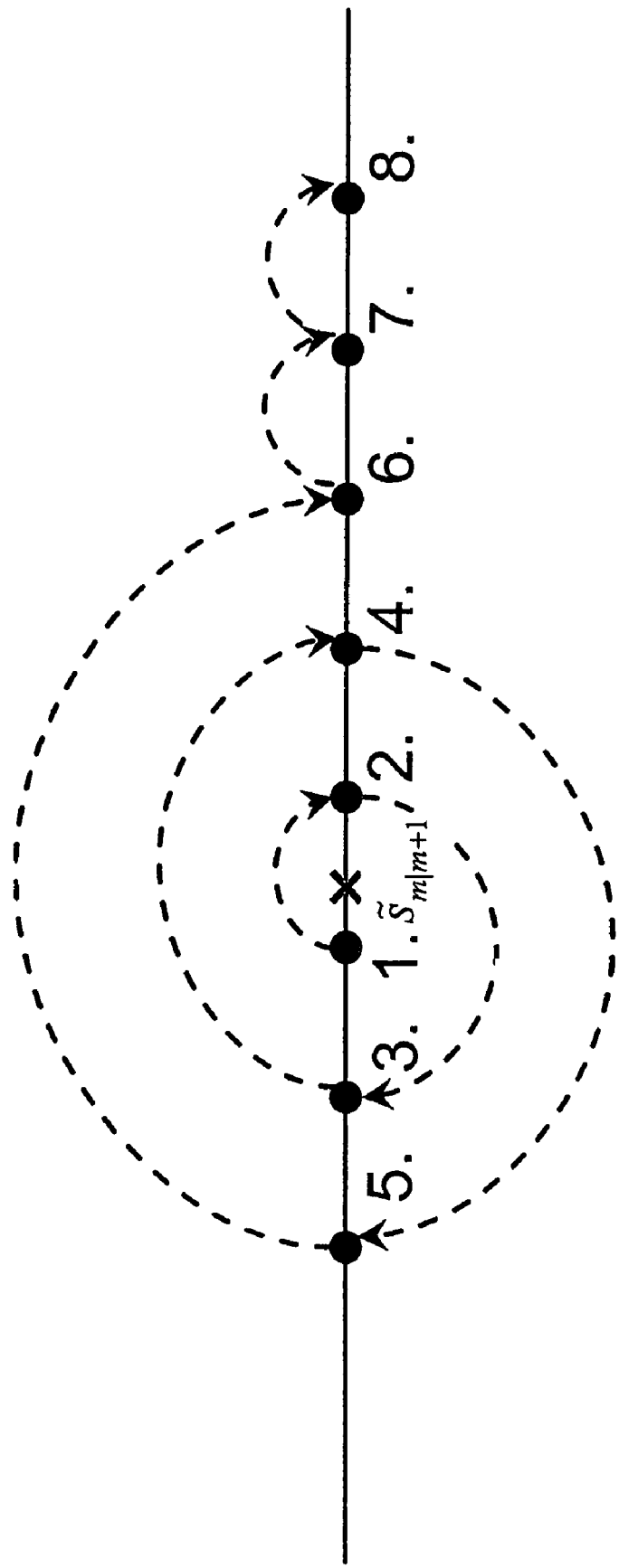
FIG. 9 is a schematic view of a sphere decoding.

Next, for a given layer, the enumeration strategy is to guarantee that nodes resulting in a smaller Euclidean distance increment (EDI) will be visited preferentially (step S705). More particularly, nodes in the same layer are enumerated around $\tilde{s}_{m|m+1}$ in a zigzag fashion because the EDI is proportional to the square of the difference between the selected node and $\tilde{s}_{m|m+1}$ (step S706), as illustrated in FIG. 9.

Next, when all child nodes in the m-th layer associated with a survival path retained from (m+1)-th layer are visited, another survival path ($K_{m+1}$ survival paths in total) is then selected to repeat the search until all the survival paths are completely examined (step S707). The enumeration order of survival paths is based on their individual PED, where a survival path with smaller PED is preferentially examined. For example, if the (m+1)-th layer comprises 10 survival paths ($K_{m+1}$=10), and 64-QAM is implemented (each layer comprises 8 nodes), there are at most 80 possible combinations (or paths) to be checked in the m-th layer. However, if $K_m$=5, only 5 paths are retained to the (m−1)-th layer, the actual number of combinations to be checked is far fewer than 80 because the SE numeration method helps to reasonably exclude unsatisfied paths. A search process for a current survival path will be terminated when the amount of PED of the current survival path is greater than each previously located 5 survival paths, and another survival path is then searched (step S708). When all existing survival paths have been visited, 5 survival paths with smallest PED for the m-th layer are determined (step S709), and a node in the (m−1)-th layer relating to a shortest survival path (with smallest PED) resulting in a smallest EDI is first searched using the described procedure (step S710).

When the $M_{df}$-th layer is achieved, nodes are visited using the depth-first search (DFS) with the $C_m$ value (step S711). End nodes of the retained $K_{Mdf+1}$ survival paths from the ($M_{df+1}$)-th layer serve as the parent nodes of the next layer to proceed with depth-first search (DFS) (based on the predefined initial radius constraint, the number of actually retained survival paths may be smaller than $K_{Mdf+1}$) (step S712), and the survival path with smallest PED among $K_{Mdf+1}$ ones is first used to perform depth-first search (DFS) (step S713). Then, based on the selected survival path [$s_{M_{df}+1}$, $s_{M_{df}+2}$, . . . $s_M$] the node $\hat{s}_{M_{df}|M_{df}+1}$=slice($\tilde{s}_{M_{df}|M_{df}+1}$) which results in smallest EDI in the $M_{df}$-th layer is enumerated first and the same rule is applied to determine the prior node in each of the following layers (step S714). When m=1, a new $r^2$ can be obtained to update the radius constraint and the search backs to m=2.

In DFS portion, a search path should visit the child node which leads to a smallest EDI preferentially. IF the PED of a search path whose end node resides in the m-th layer is greater than the radius constraint, the search path should back to the (m+1)-th layer to select another parent node according to the zigzag (SE) enumeration method.

In DFS portion, given a search path ([$s_{m+1}$, $s_{m+2}$, . . . $s_M$]), the number of nodes to be enumerated in the m-th layer is constrained to $C_m$. See FIG. 9 for an example. If $C_m$=4, only 4 nodes closest to $\tilde{s}_{m|m+1}$ (labeled as 1, 2, 3, and 4) are allowed to be visited during the SE enumeration for further searching. The other nodes (labeled as 5, 6, 7, and 8) will be skipped to prevent further searching, and the search path should back to the (m+1)-th layer to select another parent node according to the zigzag (SE) enumeration method (step S715).

Unlike the conventional depth-first search (DFS), when the search is back to ($M_{df}$+1)-th layer, another survival path with smallest PED among those unexplored ones retained from ($M_{df}$+1)-th layer is selected to proceed with DFS. When no survival path can be selected to proceed, the search completes and the path [$s_1$, $s_2$, . . . , $s_M$] with minimum ED is considered to be the maximum likelihood (ML) solution (step S716).

In FIG. 15, Steps S1501-S1503 are corresponding to the steps S701-S704 for determining the system parameters, steps S1504-S1509 are corresponding to the steps S705-S710 for breadth-first search (BFS), and steps S1510-S1511 are corresponding to the steps S711-S716 for depth-first search (DFS).

Figure 10:
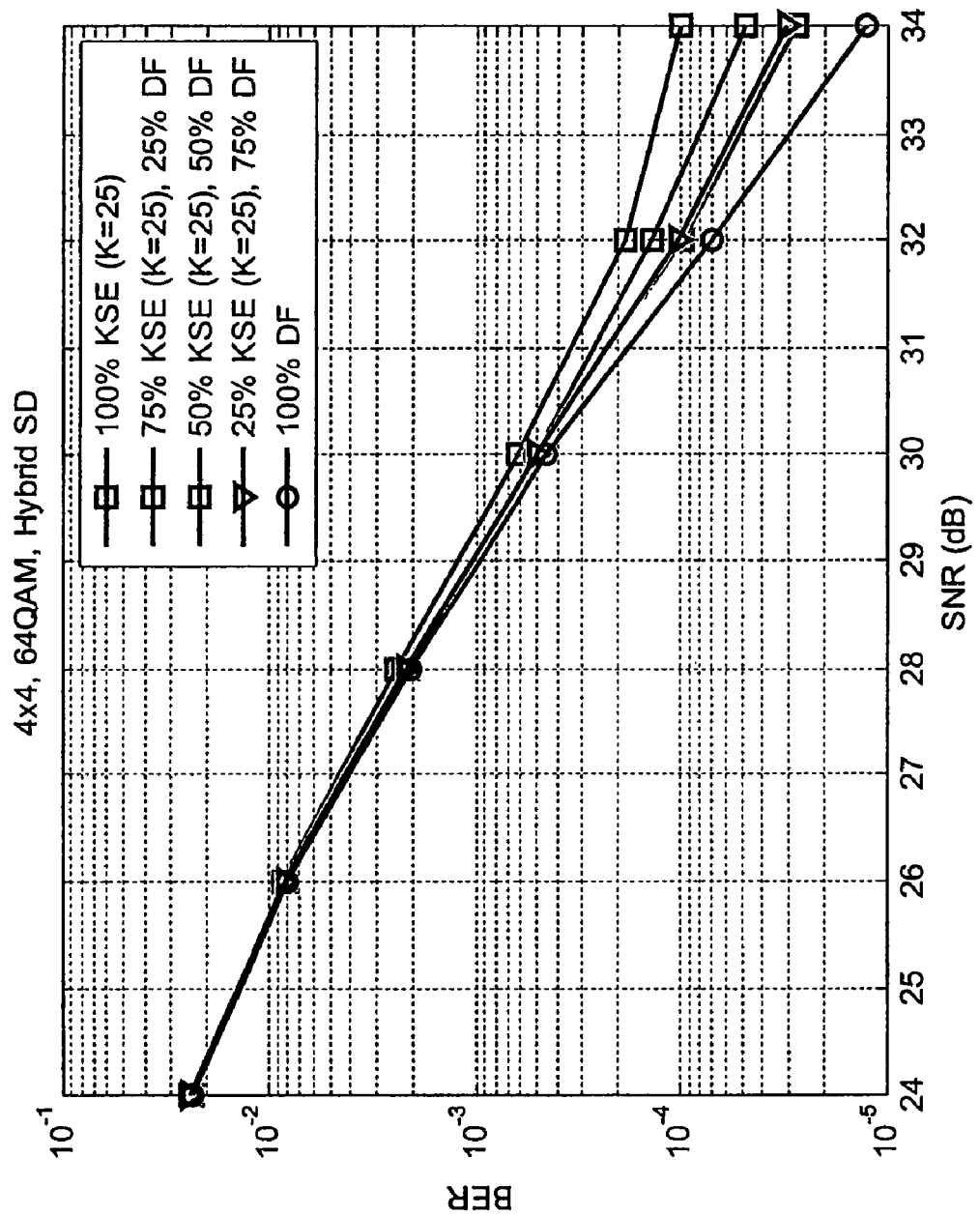
FIG. 10 is a schematic view of a hybrid sphere decoding combining the depth-first search (DFS) and the K-best method.
Figure 11:
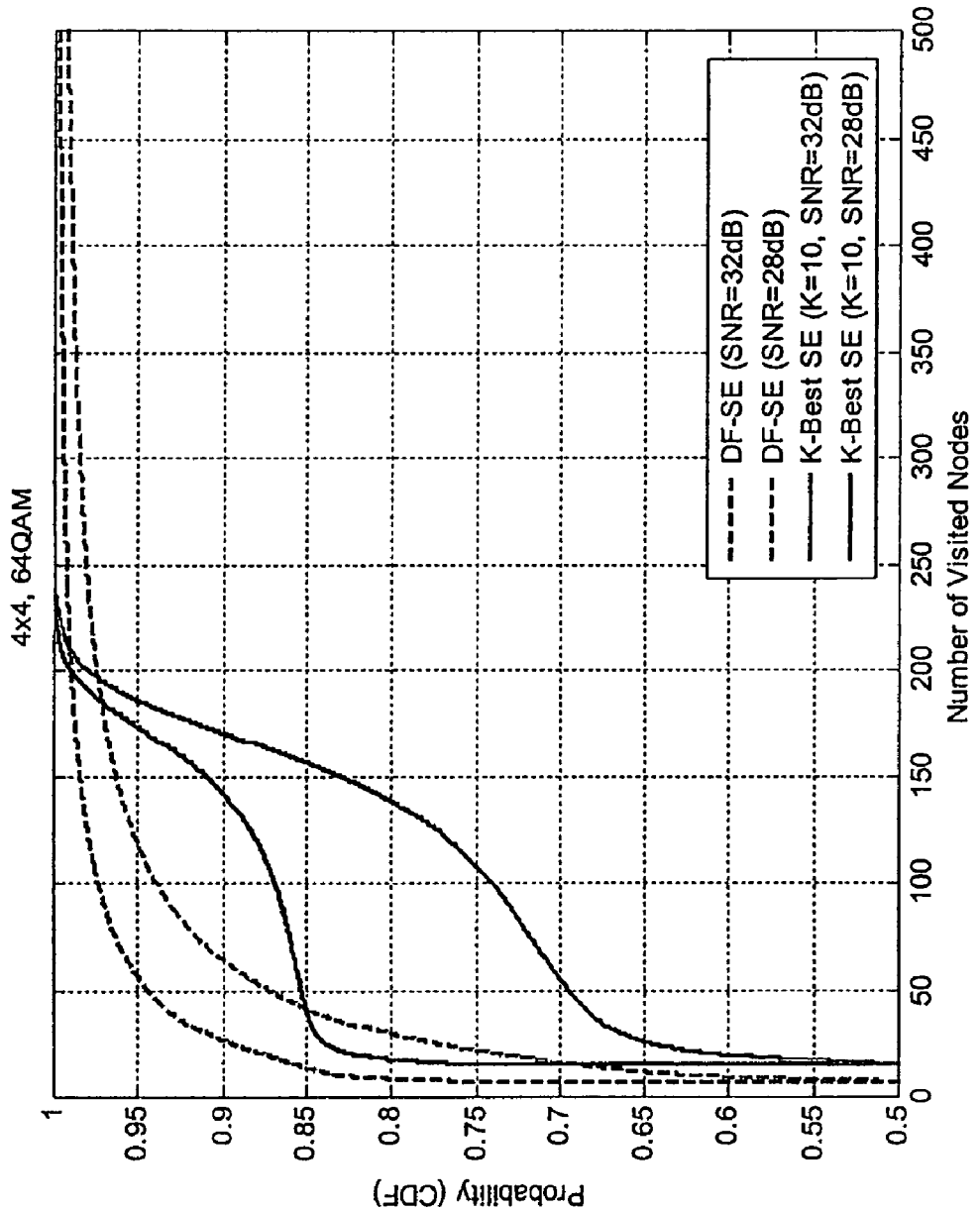
FIGS. 11-13 are curve diagrams of decoding delay distribution.
Figure 12:
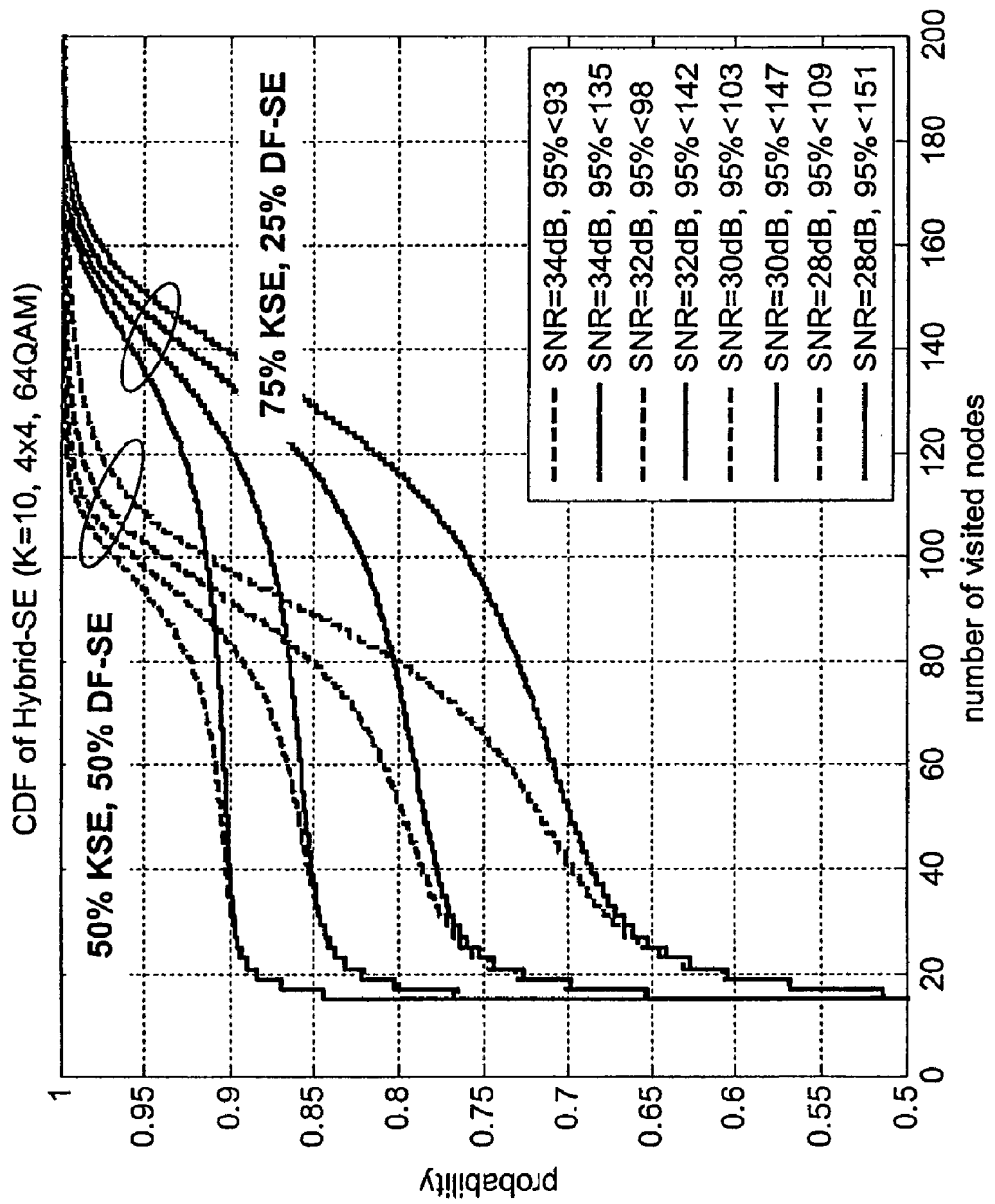
Figure 13:
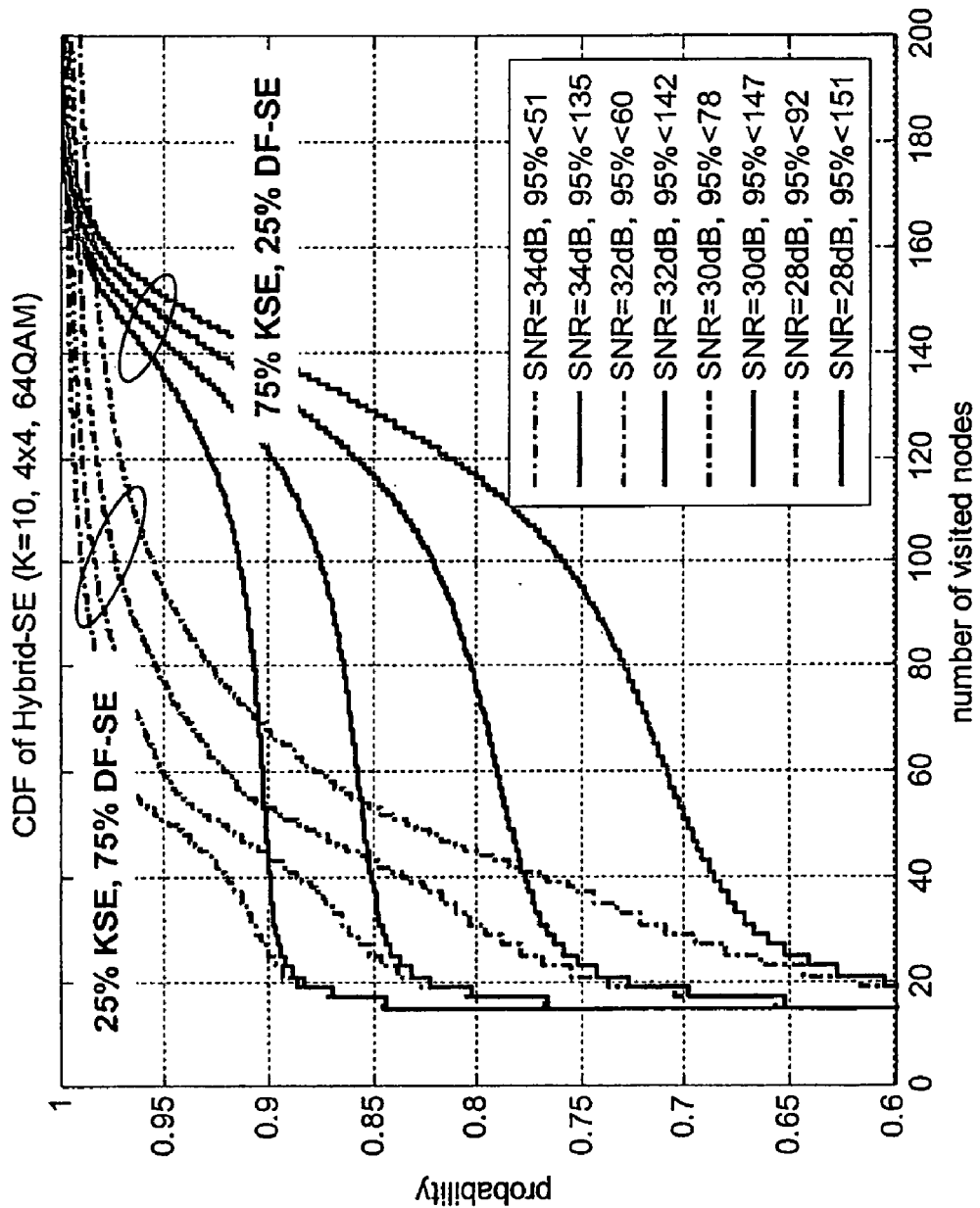
Figure 14:
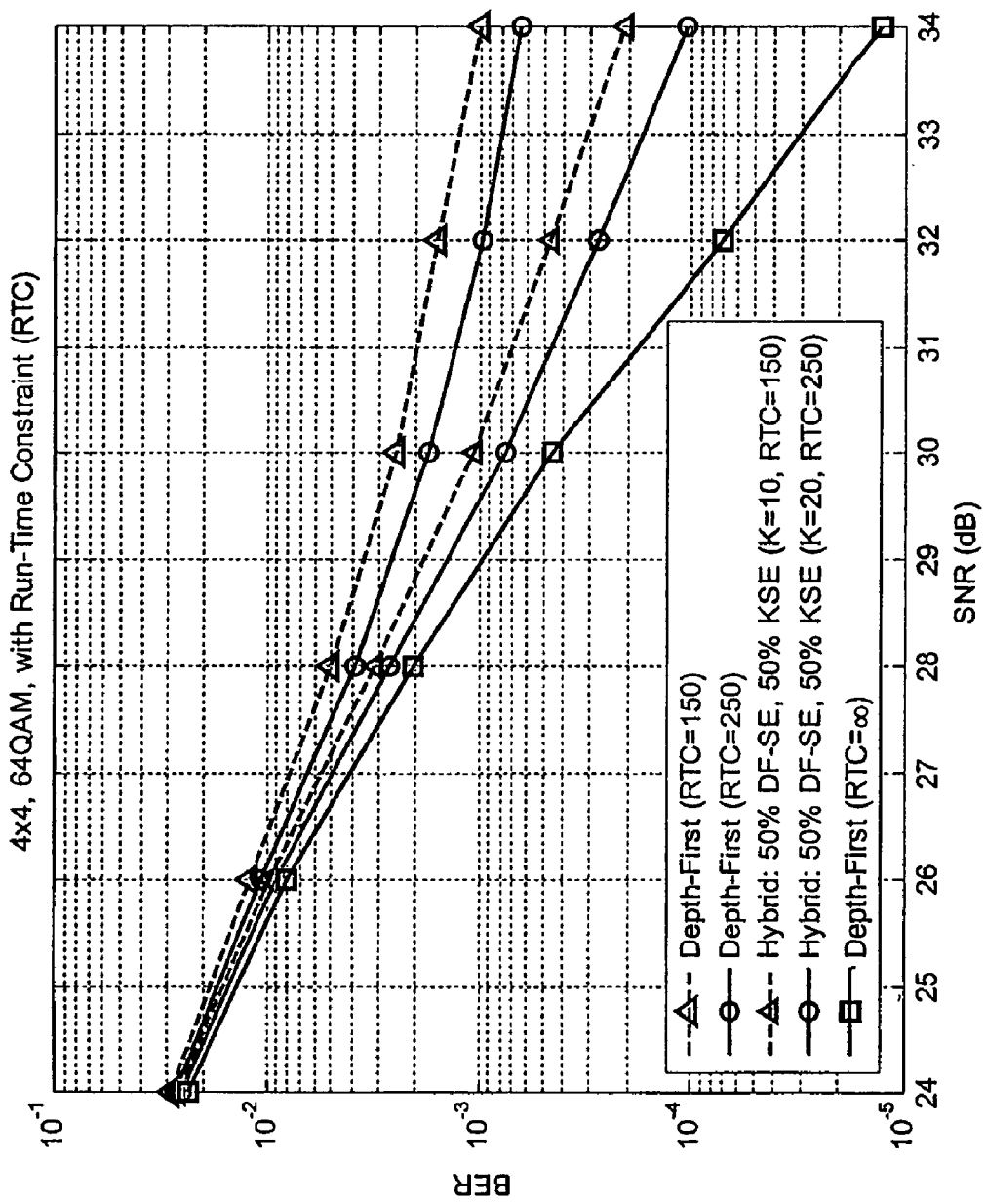
FIG. 14 shows improved bit error rate (BER) performance under run time constraint (RTC)

FIG. 10 is an illustration of a hybrid sphere decoding combining the depth-first search (DFS) and the K-best method, in which the bit error rate (BER) performance is between the depth-first search (DFS) and the K-best method. FIGS. 11-13 are curve diagrams of decoding delay distribution, which can be controlled by adjusting the search ration (DF_ratio). Thus, the bit error rate (BER) performance is highly improved under run time constraint (RTC), as shown in FIG. 14.

An embodiment of the method can also be applied to a communication device (not shown). The communication device comprises a processing unit (not shown) performing the hybrid sphere decoding method. Further, the communication device may be a mobile station, a base station, an access point, a portable device, or a desktop, while the processing unit may be a digital signal processing (DSP) unit or an application specific integrated circuit (ASIC).

An embodiment of a hybrid sphere decoding method is applied to symbol detection of an MIMO system, realizing the maximum likelihood detection by a cost function. The cost function represents the norm of difference between a lattice point to a sphere center in the multidimensional space and an upper limit value thereof represents the radius of a constraint sphere. The hybrid sphere decoding method first searches nodes residing in upper layers using the breadth-first search (BFS) method and then searches nodes residing in lower layers using the depth-first search (DFS) method. The number of searched layers for the breadth-first search (BFS) and the depth-first search (DFS), $K_m$ of each layer in the breadth-first search (BFS) portion, and $C_m$ of each layer in the depth-first search (DFS) portion are dynamically determined according to signal to noise ratio (SNR), the amount of transmit and receive antennas, modulation order, bit error rate (BER) requirement, and runtime constraint.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hybrid sphere decoding method, comprising:
   processing received data, by a processing unit, to obtain preliminary parameters;
   determining top $M_{bf}$ layers to use a breadth-first (BF) search and bottom $M_{df}$ layers to use a depth-first (DF) search, by a configure unit, wherein the breadth-first search is an uninformed search method that expands and examines all nodes of a graph systematically without considering a target until the target is located, and wherein the depth-first search is an uninformed search that progresses by expanding a first child node of a search tree that appears and thus continues deeper until a target node is located or until it hits a node that has no children; and
   implementing a search process, by a search unit, based on the preliminary parameters, wherein top $M_{bf}$ layers are searched using the breadth-first search and bottom $M_{df}$ layers are searched using the depth-first search.

2. The hybrid sphere decoding method as claimed in claim 1, processing
   received data, by the processing unit, to obtain preliminary parameters further comprising:
   column reordering and QR decomposing a channel matrix to generate an upper-triangular matrix; and
   setting an initial sphere radius.

3. The hybrid sphere decoding method as claimed in claim 1, further comprising:
   determining $M_{bf}$ layers to use breadth-first search, $M_{df}$ layers to use depth-first search, $K_m$ survival paths to be selected from each breadth-first (BF) layer, and $C_m$ nodes to be enumerated at each depth-first (DF) layer, by the configure unit, according to at least one of system parameters, transmission environment and performance requirements.

4. The hybrid sphere decoding method as claimed in claim 3, implementing a search process, by the search unit, further comprising:
   implementing a first search process to the breadth-first (BF) layers according to a $K_m$ value used in the breadth-first search; and
   implementing a second search process to the depth-first (DF) layers based on the $K_{Mdf+1}$ survival paths used in the depth-first search with the $C_m$ value.

5. The hybrid sphere decoding method as claimed in claim 3, wherein the system parameters comprise at least one of signal to noise ratio (SNR), run time constrain (RTC), a number of transmit antennas, a number of receive antennas, and a modulation order.

6. The hybrid sphere decoding method as claimed in claim 1, further comprising:
   when the breadth-first search is implemented to a breadth-first (BF) layer, by the search unit, searching nodes in the ascending order according to a distance from nodes to $\tilde{s}_{m|m+1}$, that is,
   searching nodes in the same layer in a zigzag fashion by a Schnorr-Euchner (SE) enumeration method, wherein the Schnorr-Euchner enumeration method visits the child node which results in a smallest Euclidean distance increment(EDI) for each layer, and
   calculating their corresponding PED.

7. The hybrid sphere decoding method as claimed in claim 6, further comprising:
   when child nodes in the m-th layer of the breadth-first (BF) layers associated with a survival path retained from (m+1)-th layer are all visited, selecting another survival path with smallest PED among those unexplored ones, by the search unit, to repeat the search until the $K_{m+1}$ survival paths are completely examined.

8. The hybrid sphere decoding method as claimed in claim 7, further comprising:
   when $K_{m+1}$ survival paths retained from the (m+1)-th layer have been examined, determining the $K_m$ survival paths with smallest partial Euclidean distance (PED) for the m-th layer; and
   preferentially searching nodes at the (m−1)-th layer associated with the survival path with smallest PED retained from the m-th layer.

9. The hybrid sphere decoding method as claimed in claim 1, further comprising:
   when the $M_{df}$-th layer is reached, visiting, by the search unit, nodes using the depth-first search;
   serving end nodes of the retained $K_{mdf+1}$ survival paths from the ($M_{df}$+1)-th layer as parent nodes of the next layer; and
   implementing the depth-first search to the survival path with smallest partial Euclidean distance (PED) among those unexplored ones preferentially.

10. The hybrid sphere decoding method as claimed in claim 1, further comprising:
    enumerating, by the search unit, $C_m$ nodes that are closest to $\tilde{s}_{m|m+1}$ at each DF layer in a Schnorr-Euchner enumeration order during depth-first searching,
    when the bottom (1st) layer is reached and a smaller Euclidean distance (ED) is obtained, update a sphere radius with the present ED.

11. The hybrid sphere decoding method as claimed in claim 1, wherein when no survival path retained from the ($M_{df}$+1)-th layer can be selected to proceed, completing the search and considering a search path with the minimum Euclidean distance (ED) to be the maximum likelihood (ML) solution.

12. A hybrid sphere decoding system, comprising:
    a configure unit, determining top $M_{bf}$ layers to use a breadth-first search and bottom $M_{df}$ layers to use a depth-first search, wherein the breadth-first search is an uninformed search method that expands and examines all nodes of a graph systematically without considering a target until the target is located, and wherein the depth-first search is an uninformed search that progresses by expanding a first child node of a search tree that appears and thus continues deeper until a target node is located or until it hits a node that has no children;
    a preprocessing unit, processing received data to obtain preliminary parameters; and
    a search unit, implementing a search process based on the preliminary parameters, wherein top $M_{bf}$ layers are searched using breadth-first search and bottom $M_{df}$ layers are searched using depth-first search.

13. The hybrid sphere decoding system as claimed in claim 12, wherein the preprocessing unit reorders columns of the channel matrix, performs QR decomposition the a channel matrix to generate an upper-triangular matrix, and sets an initial sphere radius.

14. The hybrid sphere decoding system as claimed in claim 13, wherein the search unit enumerates Cm nodes that are closet to $\tilde{s}_{m|m+1}$ at each DF layer in the a Schnorr-Euchner enumeration order during depth-first searching, and when the bottom (1st) layer is reached and a smaller Euclidean distance (ED) is obtained, update the sphere radius with a present ED.

15. The hybrid sphere decoding system as claimed in claim 12, wherein the configure unit determines $M_{bf}$ layers to use breadth-first search, $M_{df}$ layers to use depth-first search, $K_m$ survival paths to be selected from each breadth-first (BF)

layer, and $C_m$ nodes to be enumerated at each depth-first (DF) layer according to at least one of system parameters, transmission environment and performance requirements.

16. The hybrid sphere decoding system as claimed in claim 15, wherein the search unit implements a first search process to the breadth-first (BF) layers according to a $K_m$ value using the breadth-first search, and implements a second search process to the depth-first (DF) layers based on the $K_{Mdf+1}$ survival paths using the depth-first search with the $C_m$ value.

17. The hybrid sphere decoding system as claimed in claim 15, wherein the system parameters comprise at least one of signal to noise ratio (SNR), run time constraint (RTC), a number of transmit antennas, a number of receive antennas, and a modulation order.

18. The hybrid sphere decoding system as claimed in claim 12, wherein, when the breadth-first search is implemented to a breadth-first (BF) layer, the search unit preferentially searches nodes resulting in a smaller increment of a partial Euclidean distance (PED), and enumerates nodes in the same layer in a zigzag fashion by a SE enumeration method.

19. The hybrid sphere decoding system as claimed in claim 18, wherein, when child nodes in the m-th layer for the breadth-first (BF) layers associated with a survival path retained from the (m+1)-th layer are all visited, the search unit selects another survival path with smallest PED among those unexplored ones to repeat the search until the $K_{m+1}$ survival paths are completely examined.

20. The hybrid sphere decoding system as claimed in claim 19, wherein, if $K_m$ survival paths are selected to be retained to the (m−1)-th layer and the amount of partial Euclidean distance (PED) of the current search path is greater than each previously located $K_m$ survival paths, the search unit terminates the search process for the current search path and searches another survival path.

21. The hybrid sphere decoding system as claimed in claim 20, wherein, determining the $K_m$ survival paths with smallest partial Euclidean distance (PED) for the m-th layer, and preferentially searching nodes at the (m−1)-th layer associated with the survival path with smallest PED among $K_m$ survival paths, when $K_{m+1}$ survival paths retained from the (m+1)-th layer have been examined.

22. The hybrid sphere decoding system as claimed in claim 12, wherein, when the $M_{df}$-th layer is reached, the search unit visits nodes using the depth-first search, serves end nodes of the retained $K_{Mdf+1}$ survival paths from the $(M_{df}+1)$-th layer as parent nodes of the next layer, and preferentially implements the depth-first search to the survival path with smallest partial Euclidean distance (PED) among $K_{Mdf+1}$ survival paths.

23. A communication device, comprising:
a processing unit, processing a received data to obtain preliminary parameters, determining $M_{bf}$ layers to use a breadth-first search and $M_{df}$ layers to use a depth-first search, and implementing a search process based on the preliminary parameters, wherein top $M_{bf}$ layers are searched using breadth-first search and bottom $M_{df}$ layers are searched using depth-first search.

24. The communication device as claimed in claim 23, wherein the communication device is a mobile station, a base station, an access point, a portable device, or a desktop.

25. The communication device as claimed in claim 23, wherein the processing unit is a digital signal processing (DSP) unit or an application specific integrated circuit (ASIC) or a computer.

* * * * *